No. 662,030.  
D. L. SAUERHERING.  
AUTOMOBILE.  
(Application filed June 4, 1900.)  
Patented Nov. 20, 1900.

(No Model.)

Witnesses.  
Inventor.  
Douglas L. Sauerhering  
By Benedict & Morsell  
Attorneys.

THE NORRIS PETERS CO., PHOTO-LITHO., WASHINGTON, D. C.

UNITED STATES PATENT OFFICE.

DOUGLAS L. SAUERHERING, OF WAUSAU, WISCONSIN.

AUTOMOBILE.

SPECIFICATION forming part of Letters Patent No. 662,030, dated November 20, 1900.

Application filed June 4, 1900. Serial No. 18,957. (No model.)

*To all whom it may concern:*

Be it known that I, DOUGLAS L. SAUERHERING, of Wausau, in the county of Marathon and State of Wisconsin, have invented a new and useful Improvement in Automobiles, of which the following is a description, reference being had to the accompanying drawings, which are a part of this specification.

The object of my invention is to provide an improved construction in automobiles which involves a light but strong frame and mounting thereof, capable of being built at a minimum of expense, arranged to support the load above and directly on the rear or traction wheels with such flexibility of parts as to secure the greatest ease of the load on the wheels and the highest comfort to the users thereof, with capability of ready and easy manipulation, and other advantages incidental to the improved construction.

Figure 1:
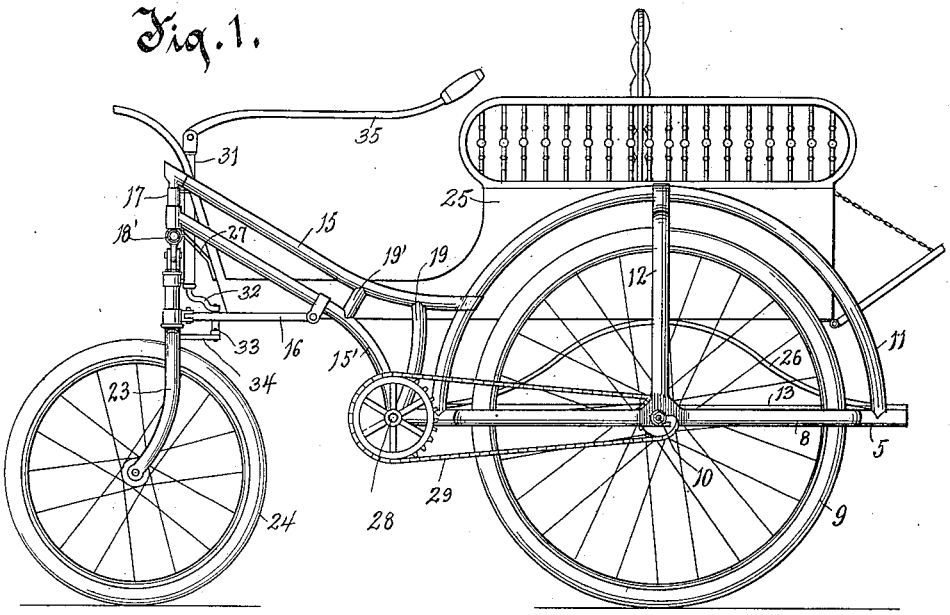
Figure 2:
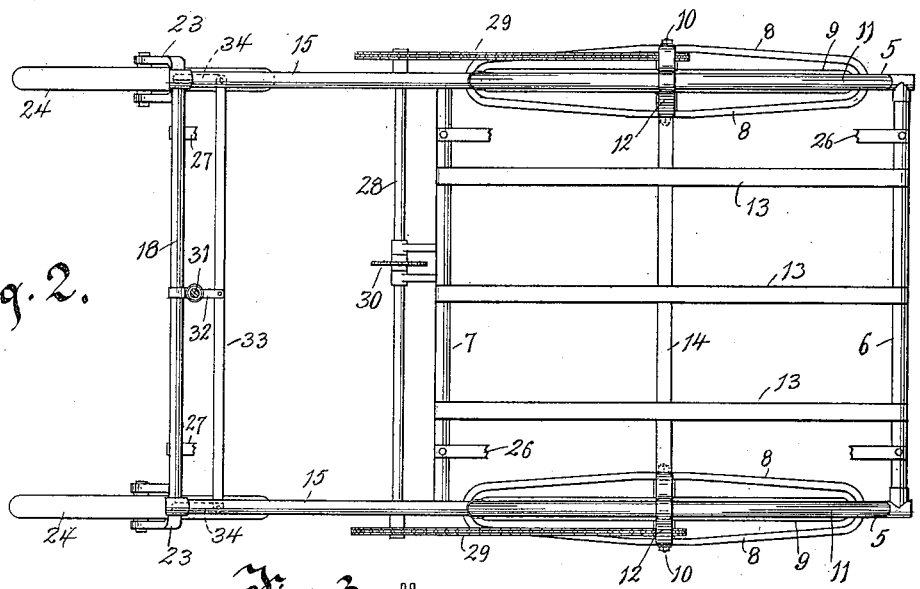
Figure 3:
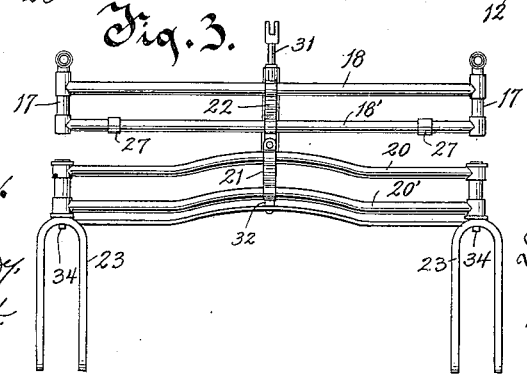

In the drawings, Figure 1 is a side elevation of an automobile containing my improved construction. Fig. 2 is a top plan view of the improved automobile, the box or body being omitted, some parts broken away, and the steering-post being in section. Fig. 3 is an elevation of the front end of the frame.

The frame of the automobile is preferably constructed chiefly of steel tubing, formed advisably in substantially the shape shown in the drawings, though I do not wish to confine my invention to the specific form of the frame otherwise than as herein stated. The main portion of the frame, on which the load of the vehicle is intended chiefly to rest, consists of the tubular side bars 5 5, connected together at the rear by the transverse bar 6 and at the front by the transverse bar 7, the side bars being made furcate and spread laterally medially, as shown at 8 8. This construction of the side bars provides a longitudinal elongated space in the side bars, within which the supporting traction-wheels 9 9 are located, the wheels being mounted revolubly in the frame on short axles 10 10, journaled, respectively, at their ends in the adjacent bars 8 8. Trusses 11 11 are secured at their ends to the side bars 5 5 in front and at the rear of the furcate bars 8 8 and curved upwardly therefrom over the wheels 9 9. Upright fork members 12 12, rigid at their lower furcate ends to the furcate bars 8 8, opposite the bearings of the axles 10 10, extend upwardly therefrom over the wheels and are secured to the trusses 11 11 and support them medially; also, preferably, fore-and-aft straps 13 13 are secured to the rails 6 and 7 at distances apart and strengthen the construction. A cross-strap 14 may also be employed connecting the inner furcate bar 8 at one side of the frame to the inner furcate bar at the other side of the frame.

Forwardly-extending side bars 15 15' are secured at their rear ends, respectively, to the side bars 5 5 and to the trusses 11 11 and at their front ends are secured to short vertical posts 17 17, to which are affixed conveniently by tubular collars two parallel front crossbars 18 18'. The forwardly-extending side bars 15 and 15' may be connected together and the construction strengthened by braces 19 19'. Directly below the cross-bars 18 18' two other cross-bars 20 20', disposed one above the other, are secured together medially by a tie-strap 21, and this tie-strap 21 at its upper end, just above the bar 20, is pivoted to a tie-strap 22, secured to the cross-bars 18 18'. Links 16 16, hinged to the extremities of the cross-bar 20', are also hinged to the forward side rails 15' conveniently by clips around the side rails. The construction permits of the oscillation of the cross-bars 20 20' and of the cross-bars 18 18' with reference to each other. The stems of the front-wheel posts 23 23 are mounted rotatably in the extremities of the cross-bars 20 20', and these cross-bars 20 20', with the strap 21, form the front-wheel frame. The front wheels 24 24 are axled in the lower extremities of the furcate portions of the wheel-posts 23.

On the frame a body or box 25 is mounted, the rear portion being supported on springs 26, that are advisably of the elongated elliptical form supported at their ends on the cross-bars 6 and 7 and on which the box 25 rests medially. At its front end the box is supported by hangers 27 27, preferably slightly elastic, attached at their front ends to the transverse bar 18' of the frame and at their rear ends to the box. This construction permits of the up-and-down movement of the rear portion of the box, on which the load is principally placed. In the drawings two seats are shown on the box, one seat facing toward the front and the other toward the rear. The seats are so located that when occupied by persons riding thereon the load will be almost directly over the axles of the wheels 9, although the division between the front and the rear seat is preferably a little at the front of the vertical plane of the axles.

For driving the traction-wheels 9, and thus compelling the forward or back travel of the automobile, a driving-shaft 28 is journaled in the frame a little in front of the wheels 9, and this shaft is connected to the axle 10 by sprocket-chains 29, running on sprocket-wheels on the shaft and on the axles. Another sprocket-wheel 30 on the shaft 28 is adapted to receive a sprocket-chain thereon that shall run to a shaft in connection with and driven by a motor mounted on the automobile, the motor being preferably located in the box 25 under the seats thereon. The motor is not shown in the drawings.

For guiding the automobile a steering-post 31 is mounted revolubly on the cross-bars 18 18' centrally conveniently by means of a sleeve or journal-box bearing that is secured directly to the bars 18 18', and a crank-arm 32, fixed on the steering-post, is pivoted at its extremity to a shifting-bar 33, the lateral extremities of which are pivoted to crank-arms 34 34, affixed to and projecting from the wheel-posts 23. A steering-post handle 35 is pivoted in the steering-post at its upper end and is adapted to be swung from side to side by the person in charge of the automobile, thus shifting the front wheels and giving direction to the travel of the automobile.

What I claim as my invention is—

1. In an automobile, a light strong frame constructed chiefly of metal tubing including tubular furcate side bars straddling and near to the traction-wheels, traction-wheels severally axled in the side bars, and tubular trusses secured to said side bars at the front and at the rear of the wheels and extending in the vertical planes of the wheels in an arc over the wheels.

2. In an automobile, a light strong frame constructed chiefly of metal tubing including tubular furcate side bars straddling the traction-wheels, traction-wheels severally axled in the side bars, tubular trusses secured to said side bars at the front and at the rear of the wheels and extending in the vertical planes of the wheels in an arc over the wheels, and tubular upright forked members secured at their furcate ends to the furcate members of the side bars substantially at the locality of the axle-bearings and extending thence upwardly to and supporting the trusses.

3. An automobile-frame, comprising side bars 5, 5, cross-bars 6, 7 trusses 11, 11 on the side bars over the wheels, other side bars 15, 15' extending forwardly from the first-mentioned side bars and the trusses, posts 17, 17 to which the forward side bars are fixed, and parallel front cross-bars 18, 18' secured to the posts.

4. In combination, a rigid automobile-frame, traction-wheels on which the rear portion of the frame is mounted, a front-wheel frame comprising a plurality of cross-bars secured centrally to each other and hinged to the rigid frame so as to be capable of oscillation in a substantially vertical plane, wheel-posts mounted rotatably in the extremities of the cross-bars, and front guiding-wheels axled in the forks of the wheel-posts.

5. In combination, a rigid automobile-frame, traction-wheels on which the rear portion of the frame is mounted, a front-wheel frame comprising a plurality of cross-bars secured centrally to each other and hinged to the rigid frame so as to be capable of oscillation in a substantially vertical plane, hinged links 16 connecting the lateral extremities of the front-wheel frame to the rigid frame preventing forward or rearward movement of the wheel-frame relative to the rigid frame.

6. In combination in an automobile, a rigid frame, traction-wheels supporting the rear portion of the frame, a front-wheel frame comprising a plurality of cross-bars secured centrally to each other and hinged to the rigid frame so as to be capable of substantially vertical oscillation, hinged links 16 connecting the lateral extremities of the front-wheel frame to the rigid frame, wheel-posts mounted rotatably in the extremities of the cross-bars, wheels axled in the forks of the wheel-posts, a steering-post rotatable on the frame and provided with a crank-handle, and a wheel-shifting bar pivoted on crank-arms on the front-wheel posts and to a crank on the steering-post.

7. In combination in an automobile, a rigid frame, a body or box, elastic hangers extending toward front and rear and secured at their front ends to the rigid frame and at their rear extremities to the box by which the box at its front end is connected to and supported yieldingly on the frame, and springs on the frame by and on which the box is supported yieldingly at its rear.

8. In an automobile, the combination of a rigid frame, traction-wheels each having a short axle by which the wheels are severally mounted in the frame, a single driving-shaft extending transversely entirely across the frame, and sprocket-chains running severally on a wheel on the driving-shaft and on the axle of a traction-wheel.

In testimony whereof I affix my signature in presence of two witnesses.

DOUGLAS L. SAUERHERING.

Witnesses:
 LEON W. DAVIS,
 LOUIS MARCHETTI.